United States Patent [19]

Rao et al.

[11] 4,190,706
[45] Feb. 26, 1980

[54] SOLID STATE CELL WITH ALKALI METAL HALO-ALKALI THIOCYANATE ELECTROLYTE

[75] Inventors: Bhaskara M. L. Rao, Fanwood; Bernard G. Silbernagel, Scotch Plains, both of N.J.

[73] Assignee: Exxon Research & Engineering Co., Florham Park, N.J.

[21] Appl. No.: 16,492

[22] Filed: Mar. 1, 1979

[51] Int. Cl.$^2$ .......................................... H01M 10/36
[52] U.S. Cl. .................................................... 429/191
[58] Field of Search ......................................... 429/191

[56] References Cited

U.S. PATENT DOCUMENTS

| 3,689,323 | 9/1972 | Mellors | 429/191 |
| 3,723,185 | 3/1973 | Mellors | 429/191 |

*Primary Examiner*—Donald L. Walton
*Attorney, Agent, or Firm*—Kenneth P. Glynn

[57] ABSTRACT

A novel electrochemical cell is disclosed utilizing: (a) an anode which contains an alkali metal as an anode-active material; (b) a cathode and (c) an elyte comprising an electrolytically effective amount of one or more compounds having the formula:

$$(AX)_m A'SCN$$

wherein A is an alkali metal, X is a halogen, A' is an alkali metal and $0.1 \leq n \leq 10$. Preferred systems include lithium-containing anodes, lithium-containing electrolytes and cathodes which contain cathode-active material selected from the group consisting of cathode-active sulfurs, halogens, halides, chromates, phosphates, oxides and chalcogenides, especially those chalcogenides of the empirical formula $MZ_m$ wherein M is one or more metals selected from the group consisting of iron, titanium, zirconium, hafnium, niobium, tantalum and vanadium, Z is one or more chalcogens selected from the group consisting of oxygen, sulfur, selenium and tellurium, and m is a numerical value between about 1.8 and about 3.2, e.g., $TiS_2$.

11 Claims, No Drawings

SOLID STATE CELL WITH ALKALI METAL HALO-ALKALI THIOCYANATE ELECTROLYTE

BACKGROUND OF THE INVENTION AND PRIOR ART

1. Field of the Invention

This invention relates to a novel electric current producing cell. More particularly, this invention relates to improvements in the electric current producing secondary cells of the type comprising an alkali metal-containing anode, a cathode and an electrolyte (hereinafter referred to as "elyte") which includes an electrolytically effective amount of one or more compounds having the formula:

$$(AX)_n A'SCN \qquad (1)$$

wherein A and A' are alkali metals and X is a halogen.

2. Description of the Prior Art

There has been considerable interest in recent years in developing high energy density batteries or voltaic cells. Among the systems being investigated are those employing nonaqueous liquid, fused or solid elytes, lightweight metals, such as alkali metals, as anodes, and cathodes containing metal chalcogenide compounds as described, for example, in U.S. Pat. Nos. 3,988,164; 3,925,098; 3,864,167 and 3,791,867.

Various efforts have been made to develop new solid state elytes for secondary cell systems. Alkali metal-aluminum-chlorine and alkali metal-aluminum-bromine compounds have been utilized in liquid and molten state elyte systems, e.g., as described in U.S. Pat. No. 3,877,984 and U.S. Pat. No. 3,751,298. Also, solid alkali metal-aluminum-halogen compounds have been described as useful elytes in alkali metal anode, chalcogenide cathode cells, U.S. Pat. No. 4,066,824. However, to date, there has been no suggestion that a solid compound of the above formula might be useful as an elyte in solid state systems of the type described below.

SUMMARY OF THE INVENTION

A novel electric current-producing cell of the present invention has been developed which contains: (a) an alkali metal-containing anode; (b) a cathode; and (c) a solid elyte consisting essentially of an electrolytically effective amount of one or more compounds having the formula:

$$(AX)_n A'SCN \qquad (1)$$

wherein A and A' are alkali metals, X is a halogen and $0.1 \leq n \leq 10$.

DETAILED DESCRIPTION OF THE INVENTION

A novel electric current-producing cell of the present invention is a solid state cell which contains an anode, a cathode and a solid elyte. By "solid state" is meant a cell from which electric current may be drawn at temperatures below the melting point of the elyte. Thus, some cells of the present invention may readily be employed at ambient or even lower temperatures whereas all cells of the present invention may be advantageously utilized at elevated temperatures below the melting point of the elyte.

The anode employed in the cell of the present invention is one which contains alkali metal as its active material. Desirably, the anode is substantially lithium, sodium, potassium, or an alloy containing one or more of these. Preferably, the anode is lithium metal or an alloy of lithium. The alkali metal-containing anode may be in contact with other metal structures, e.g., nickel, copper, or silver screen, which serve as current collectors and are well known in the art.

The cathode used in the cell of the present invention is one which contains as its cathode-active material any material which will render a cell functional with an alkali metal-containing anode and an elyte as described below. Desirably, the cathode is one having a cathode-active material selected from the group consisting of cathode-active sulfurs, halogens, halides, chromates, phosphates, oxides and chalcogenides. Of these, preferred are cathodes which contain as their cathode-active materials one or more chalcogenide compounds of the empirical formula:

$$MZ_m \qquad (2)$$

wherein M is one or more metals selected from the group consisting of iron, titanium, zirconium, hafnium, niobium, tantalum and vanadium, Z is one or more chalcogens selected from the group consisting of oxygen, sulfur, selenium, and tellurium, and m is a numerical value such that $1.8 \leq m \leq 3.2$. Advantageously, M is one or more metals selected from the group consisting of titanium, niobium, tantalum and vanadium. Preferably, M is titanium in Formula (2), and the titanium dichalcogenides are preferred. Also, Z in Formula (2) is advantageously sulfur. Thus, the metal sulfides are particularly useful. In the most preferred embodiments, M is titanium and Z is sulfur. Desirably, m is a numerical value such that $1.8 \leq m \leq 2.1$, and preferably, such that $1.95 \leq m \leq 2.02$.

Among the many cathode-active materials which are generically described above are the cathode-active sulfurs, such as the polysulfides and the carbon sulfurs, such as those known as the $C_xS$ type, iodine, chlorine, silver iodide, silver chromate, silver phosphate, silver oxide, and the like. Among the chalcogenides which may be used as the cathode-active material may be any of the compounds within the scope of Formula (2) above, including $FeS_2$, $TiS_2$, $ZrS_2$, $HfS_2$, $NbSe_3$, $TaS_2$, $TaSe_3$, $TaO_{2.5}$ (or $Ta_2O_5$), $VSe_2$, $VO_{2.5}$ (or $V_2O_5$), $Fe_{0.5}V_{0.5}S_2$, $V_{0.25}Ti_{0.75}S_2$ and the like.

Although not essential, the cathode-active material used in the cathode of the cell of the present invention is preferably an intercalatable compound. It should be noted that intercalated chalcogenides are such in the discharged state, and that, in the charged state, the intercalatable chalcogenide contains no intercalated species.

The cathode structure itself need not necessarily consist of the cathode-active material alone but may be a structure such as carbon, nickel, zinc, etc., upon which the cathode-active material is deposited. Some cathode-active materials such as the sulfurs and halogens are best used in combination with these support structures, whereas many of the cathode-active materials are typically good electronic conductors and may thus often serve as their own current collectors, e.g., as is the case with the chalcogenides, cathode-active material may be admixed or diluted with a minor amount of any other electrochemically active material, and alloys (i.e., solid solutions) of the individual cathode-active materials may be used as well as the individual cathode-active materials alone. The cathode may be readily fabricated from the individual or alloyed materials using other materials and methods well known in the prior art, e.g., polytetrafluoroethylene bonding agents or support structures such as nickel or copper mesh.

The elyte employed in the novel cell of the present invention is, as mentioned, one or more compounds having the formula:

$$(AX)_n A'SCN \qquad (1)$$

wherein A and A' are alkali metals and may be the same or different, wherein X is one or more halogens, and wherein $0.1 \leq n \leq 10$.

Although A and A' are alkali metals as described, and may be the same or different, desirably they are each alkali metals selected from the group consisting of lithium, sodium, potassium, rubidium and mixtures thereof, preferably from the group consisting of lithium, sodium, potassium and mixtures thereof, and most preferably at least one of A and A' is lithium.

The variable X is one or more halogens and is desirably selected from the group consisting of iodine, bromine, chlorine and mixtures thereof, and is preferably iodine.

The variable n is a value such that $0.1 \leq n \leq 10$. Desirably, it is a value such that $0.5 \leq n \leq 4$ and preferably such that $0.8 \leq n \leq 2$.

Among the elyte compounds contemplated are:
LiIKSCN
LiILiSCN
LiINaSCN
NaIKSCN
$(LiI)_2 NaSCN$
$(NaI)_{1.5} KSCN$
$(KI)_{0.5} KSCN$
$(LiI_{0.5} Cl_{0.5})_2 LiSCN$
$(Li_{0.8} Na_{0.2} I_{0.6} Br_{0.4})_3 Na_{0.5} K_{0.5} SCN$
and the like. Analogues containing other constituents and/or other ratios of constituents should now be apparent.

The elyte compound of the Formula (1) may be prepared by reacting an alkali metal halide, i.e., lithium iodide, with an alkali metal thiocyanate in an inert environment. The reactants are heated to solution at a temperature at or above the melting point of the thiocyanate, under agitation. Generally, the heating should be maintained until a color change is observed, indicating the formation of the new compound and then cooled and ground, as desired. The resulting compound, usually ground to fine powder form, may be formed into the desired shape by pressing, rolling, binding with polymeric compounds or solid high surface area materials, e.g., silica, which do not detrimentally affect the electrolytic activity of the compound, or the elyte compound may be used without additives and binders.

The solid state elyte is placed between the cathode and the anode in the cell of the present invention to achieve an advantageous electrochemical cell. In one embodiment, the elyte is rolled into or pressed into a thin sheet of about 10 mils or less. In another embodiment, the solid elyte may be melted and then cooled to form a solid sheet. In any event, the elyte comprises an electrolytically effective amount of one or more Formula (1) type compounds which may be formed into known solid elyte configurations for use in the electrochemical cell.

The present invention is illustrated by the following examples, but the invention should not be construed as being limited thereto.

EXAMPLE 1

26.6 grams of LiI and 19.4 grams of KSCN were mixed and heated in an inert helium gas environment to about 325° C. The mixture was agitated and allowed to equilibrate (for about 1 hour) until after a color change to a dark solution was observed, and then the resulting product was allowed to cool. Because it is relatively hygroscopic, the solid product was ground to a fine powder and stored in a dry state until use in a cell.

EXAMPLE 2

The LiKSCNI powder prepared by Example 1 was pelletized at 5 to 15 Tsi to a 0.5" diameter, 0.03" to 0.05" thick cylinder with a suitable die and press. The resulting pellet was placed between two lithium foils of 0.5" diameter, 0.01" to 0.02" thickness. The resistivity was measured at 1 KHZ using an ac bridge and temperature dependent resistivity was determined by heating the system to predetermined temperatures. The results are shown in Table I, below:

TABLE 1

| LiKSCNI Resistivity vs. Temperature | | |
|---|---|---|
| Temperature (°F.) | Resistance (ohms $\times 10^4$) | Resistivity (ohm-cm $\times 10^5$) |
| 60 | 3.7 | 2.8 |
| 80 | 1.8 | 1.35 |
| 100 | 1.05 | 0.788 |
| 120 | 0.61 | 0.457 |
| 140 | 0.33 | 0.275 |
| 160 | 0.23 | 0.173 |
| 180 | 0.14 | 0.105 |
| 200 | 0.087 | 0.065 |
| 220 | 0.071 | 0.033 |
| 240 | 0.056 | 0.042 |
| 260 | 0.045 | 0.034 |
| 280 | 0.037 | 0.028 |
| 300 | 0.029 | 0.022 |
| 320 | 0.023 | 0.017 |
| 340 | 0.019 | 0.014 |
| 360 | 0.013 | 0.0094 |
| 380 | 0.0082 | 0.0062 |
| 400 | 0.0051 | 0.0038 |

Concomitant NMR observations of the $^7Li$ nuclei indicated a high degree of Li ionic mobility at temperatures above −50° C. An appreciable fraction (20%–100%) are mobile. These resistivity and NMR observations suggest that LiKSCNI is a lithium ion conducting solid electrolyte for use in conjunction with lithium cells.

EXAMPLE 3

Based on the results of Table 1, it is possible to project the IR loss (voltage loss due to internal resistance of the electrolyte) at various temperatures and current densities for different thicknesses of the solid electrolyte separator. These are given for 0.001"–0.025" thickness at 1 $\mu A$–$10^n$/cm$^2$ at 25° C.–200° C. in Tables 2 and 3. It is seen from these tables that lithium cells capable of 1–10 $\mu A/cm^2$ at 25° C. and 1–10 $\mu mA/cm^2$ at 200° C. are possible with acceptable separator impedance.

TABLE 2

LiKSCNI ELYTE CELL IR LOSS
(Temperature 25° C.)

| Separator Thickness ($\mu$) | Separator Resistance ($\Omega$) | IR Loss (milli volts) at: | | |
|---|---|---|---|---|
| | | $1\mu A/cm^2$ | $5\mu A/cm^2$ | $10\mu A/cm^2$ |
| 25.4 | 362.7 | 0.36 | 1.8 | 3.63 |
| 127 | 1813.6 | 1.81 | 9.07 | 18.0 |
| 254 | 3627 | 3.63 | 18.0 | 36.0 |
| 381 | 5440 | 5.4 | 27.0 | 54.0 |
| 508 | 7554 | 7.25 | 36.0 | 72.5 |
| 635 | 9067 | 9.07 | 45.0 | 90.7 |

TABLE 3

LiKSCNI ELYTE CELL IR LOSS
(Temperature 200° C.)

| Separator Thickness ($\mu$) | Separator Resistance ($\Omega$) | IR loss (milli volts) at: | | |
|---|---|---|---|---|
| | | $1nA/cm^2$ | $5nA/cm^2$ | $10nA/cm^2$ |
| 25.4 | 1.27 | 1.27 | 6.35 | 12.7 |
| 127 | 6.35 | 6.35 | 31.7 | 63.5 |
| 254 | 12.7 | 12.7 | 63.5 | 127.0 |
| 381 | 19.05 | 19.0 | 95.2 | 190.0 |
| 508 | 25.4 | 25.4 | 127.0 | 254.0 |
| 635 | 31.75 | 31.8 | 158.0 | 317.0 |

EXAMPLES 4–6

A range of compositions with varying LiI to KSCN ratios were formed and the resistivity studies suggest that the 1:1 sample has optimum resistivity at low temperatures, as indicated in Table 4. Nonetheless, all of these materials are reasonable superionic conductors, and another composition may prove preferable for other reasons.

TABLE 4

RESISTIVITY vs. COMPOSITION
$(LiI)_n KSCN$ at 80° F.

| Example | n | Resistivity ($\Omega$-cm) |
|---|---|---|
| 4 | 4 | $3.24 \times 10^5$ |
| 5 | 2 | $2.16 \times 10^5$ |
| 6 | 1 | $1.35 \times 10^5$ |

EXAMPLE 7

It was observed that heating LiI KSCN flux in the presence of an organic vapor like dioxolane can lead to the inclusion of a small amount of organic material. Proton NMR studies of products made in such a way suggest that one organic molecule of dioxolane per 10 to 100 formula units of flux may be so included. The $^7$Li NMR spectra from such materials suggest a higher fraction of mobile species and such treatments may be used as promoters in preparing the electrolytes.

What is claimed is:

1. An electric current-producing cell, comprising:
   (a) an alkali metal-containing anode;
   (b) a cathode; and,
   (c) a solid electrolyte consisting essentially of one or more compounds of the formula:

$(AX)_n A'SCN$ wherein A and A' are alkali metals and may be the same or different, wherein X is one or more halogens and wherein n is a value such that $0.1 \leq n \leq 10$.

2. The cell of claim 1 wherein the anode is substantially lithium, sodium, potassium or alloys containing these.

3. The cell of claim 2 wherein A and A' are each selected from the group consisting of lithium, sodium, potassium and mixtures thereof.

4. The cell of claim 3 wherein X is a halogen selected from the group consisting of iodine, bromine, chlorine and mixtures thereof.

5. The cell of claim 4 wherein at least one of A and A' is lithium.

6. The cell of claim 5 wherein the anode is substantially lithium or a lithium alloy.

7. The cell of claim 6 wherein n is a value such that $0.5 \leq n \leq 4$.

8. The cell of claim 7 wherein n is a value such that $0.8 \leq n \leq 2$.

9. The cell of claims 1, 2, 3, 4, 5, 6, 7 or 8 wherein said cathode contains cathode-active material selected from the group consisting of sulfurs, halogens, halides, chromates, phosphates, oxides and chalcogenides.

10. The cell of claims 1, 2, 3, 4, 5, 6, 7 or 8 wherein said cathode contains as its cathode-active material one or more chalcogenides of the formula:

$MZ_m$ wherein M is one or more metals selected from the group consisting of iron, titanium, zirconium, hafnium, niobium, tantalum and vanadium, wherein Z is one or more chalcogens selected from the group consisting of oxygen, sulfur, selenium and tellurium, and wherein m is a numerical value such that $1.8 \leq m \leq 3.2$.

11. The cell of claim 10 wherein said chalcogenide is sulfur and wherein m is a value such that $1.8 \leq m \leq 2.1$.

* * * * *